(12) United States Patent
Roche et al.

(10) Patent No.: US 9,594,812 B2
(45) Date of Patent: Mar. 14, 2017

(54) INTERFACES FOR ACCESSING AND MANAGING ENHANCED CONNECTION DATA FOR SHARED RESOURCES

(71) Applicant: Microsoft Technology Licensing, LLC, Redmond, WA (US)

(72) Inventors: Matthew Roche, Bothell, WA (US); Christian Liensberger, Bellevue, WA (US); Ziv Kasperski, Redmond, WA (US); Stéphane Nyombayire, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 14/082,401

(22) Filed: Nov. 18, 2013

(65) Prior Publication Data
US 2015/0074096 A1    Mar. 12, 2015

Related U.S. Application Data

(60) Provisional application No. 61/875,582, filed on Sep. 9, 2013.

(51) Int. Cl.
| | | |
|---|---|---|
| *G06F 17/30* | (2006.01) | |
| *G06F 3/0481* | (2013.01) | |
| *G06F 3/0484* | (2013.01) | |

(52) U.S. Cl.
CPC .. *G06F 17/30554* (2013.01); *G06F 17/30864* (2013.01); *G06F 3/0481* (2013.01); *G06F 3/04842* (2013.01); *G06F 17/30651* (2013.01)

(58) Field of Classification Search
None
See application file for complete search history.

(56) References Cited

U.S. PATENT DOCUMENTS

| | | |
|---|---|---|
| 6,438,580 B1 | 8/2002 | Mears et al. |
| 6,901,394 B2 | 5/2005 | Chauhan et al. |
| 8,200,661 B1 | 6/2012 | Pearce et al. |
| 8,447,760 B1 | 5/2013 | Tong et al. |
| 8,478,693 B1 * | 7/2013 | Weigle ............... G06Q 30/0235 705/51 |

(Continued)

OTHER PUBLICATIONS

"Request Access to Internal Data Sources", Retrieved on: Sep. 5, 2013, Available at: http://office.microsoft.com/en-us/office365-sharepoint-online-enterprise-help/request-access-to-internal-data-sources-HA104079181.aspx.

(Continued)

*Primary Examiner* — Richard Bowen
(74) *Attorney, Agent, or Firm* — Workman Nydegger

(57) ABSTRACT

Embodiments are directed to providing access to supplemental query data that is relevant to a data query. In one scenario, a computer system receives an input indicating that a data query is to be processed, where the input provides various search criteria. The computer system then generates the data query according to the search criteria in the received input. The computer system further sends the data query to a second computer system which is configured to process the data query and receives the results of the data query. The results indicate that additional data elements relevant to the search criteria have been identified. The computer system then displays an indication of various steps that are to be taken in order to access the identified additional data elements.

22 Claims, 3 Drawing Sheets

(56) References Cited

U.S. PATENT DOCUMENTS

| | | | |
|---|---|---|---|
| 8,521,655 B2 | 8/2013 | Carter | |
| 8,856,165 B1 | 10/2014 | Ciernak | |
| 9,043,942 B1* | 5/2015 | Birdwell Rockson | G06F 21/60 726/28 |
| 2001/0047279 A1 | 11/2001 | Gargone | |
| 2003/0050976 A1 | 3/2003 | Block et al. | |
| 2003/0074277 A1 | 4/2003 | Foutz | |
| 2006/0004749 A1* | 1/2006 | Dettinger | G06Q 10/06 |
| 2007/0005568 A1 | 1/2007 | Angelo et al. | |
| 2007/0043735 A1 | 2/2007 | Bodin | |
| 2007/0056034 A1* | 3/2007 | Fernstrom | G06F 21/6227 726/20 |
| 2007/0162417 A1* | 7/2007 | Cozianu | G06F 17/30011 |
| 2007/0233685 A1* | 10/2007 | Burns | G06F 17/30991 |
| 2008/0040388 A1 | 2/2008 | Petri et al. | |
| 2009/0006374 A1 | 1/2009 | Kim et al. | |
| 2009/0077043 A1 | 3/2009 | Chang | |
| 2009/0112868 A1* | 4/2009 | Rajamani | G06F 17/30867 |
| 2009/0150827 A1* | 6/2009 | Meyer | G06F 17/30867 715/810 |
| 2010/0057686 A1* | 3/2010 | Breiner | G06F 17/30864 707/E17.108 |
| 2010/0161382 A1 | 6/2010 | Cole | |
| 2010/0250867 A1 | 9/2010 | Bettger et al. | |
| 2011/0231317 A1 | 9/2011 | Arsac | |
| 2011/0302290 A1 | 12/2011 | Westerfeld et al. | |
| 2011/0314071 A1 | 12/2011 | Johnson et al. | |
| 2012/0185779 A1 | 7/2012 | Dugan et al. | |
| 2012/0291090 A1 | 11/2012 | Srinivasan et al. | |
| 2013/0191418 A1 | 7/2013 | Martin et al. | |
| 2014/0164080 A1* | 6/2014 | Thompson, Jr. | G06Q 30/02 705/14.16 |
| 2014/0279893 A1 | 9/2014 | Branton | |

OTHER PUBLICATIONS

Mitra, Saurav, "Why SAP Data Services", Published on: Oct. 10, 2012, Available at: http://www.dwbiconcepts.com/etl/23-etl-bods/116-why-sap-businessobjects-data-services.html.

"Manage Data Source Information using the Manage Data Portal", Retrieved on: Sep. 5, 2013, Available at: http://office.microsoft.com/en-us/office365-sharepoint-online-enterprise-help/manage-data-source-information-using-the-manage-data-portal-HA104079190.aspx.

"Understanding the Role of Data Stewards in Data Management", Retrieved on: Sep. 5, 2013, Available at: http://office.microsoft.com/en-us/office365-sharepoint-online-enterprise-help/understanding-the-role-of-data-stewards-in-data-management-HA104079191.aspx?CTT=5&origin=HA104079181.

Serra, Anabela, "Operational Data Store (ODS) and Enterprise Data Warehouse (EDW)", Published on: Jun. 29, 2012, Available at: http://www.dhs.gov/xlibrary/assets/privacy/privacy_pia_fema_ods_edw_20120629.pdf.

"Create, Modify, and Delete Shared Data Sources (SSRS)", Published on: Oct. 18, 2007, Available at: http://technet.microsoft.com/en-us/library/ms155845.aspx.

Gazan, Rich, "Social Annotations in Digital Library Collections", In D-Lib Magazine, vol. 14, Issue 11/12, Nov. 2008, 11 pages.

Office Action dated Sep. 14, 2015 cited in U.S. Appl. No. 14/082,481.

Office Action dated Mar. 16, 2016 cited in U.S. Appl. No. 14/082,451.

Notice of Allowance dated Sep. 26, 2016 cited in U.S. Appl. No. 14/082,451.

Office Action dated Sep. 16, 2016 cited in U.S. Appl. No. 14/082,481.

* cited by examiner

INTERFACES FOR ACCESSING AND MANAGING ENHANCED CONNECTION DATA FOR SHARED RESOURCES

CROSS-REFERENCE TO RELATED APPLICATIONS

This application claims priority to and the benefit of U.S. Provisional Patent Application Ser. No. 61/875,582, entitled "Providing Supplemental Connection Data to Access Shared Resources", filed on Sep. 9, 2013, which application is incorporated by reference in its entirety herein. This application is also related to U.S. patent application Ser. No. 14/082,451, entitled "Providing Enhanced Connection Data for Shared Resources", and U.S. patent application, Ser. No. 14/082,481, entitled "Interfaces for Providing Enhanced Connection Data for Shared Resources", both of which are filed concurrently herewith. Both related applications are incorporated by reference in their entirety herein.

BACKGROUND

Computer databases have long been used to store and provide access to data. Computer databases allow users to enter queries and receive results that are intended to satisfy the query. In many cases, the user's query may be answered by data that is stored in multiple different databases. The user may not know that the data they desire to access is stored on these databases, and, even if the user is aware of the data's location, the user may not know how to access the data. This data is often referred to as "dark data". The dark data is data that is required (or is at least useful) in answering the user's query, but is not accessible by the user.

BRIEF SUMMARY

Embodiments described herein are directed to providing access to supplemental query data that is relevant to a data query and to generating and displaying a user interface that allows access to supplemental query data that is relevant to a search query. In one embodiment, a computer system receives an input indicating that a data query is to be processed, where the input provides various search criteria. The computer system then generates the data query according to the search criteria in the received input. The computer system further sends the data query to a second computer system which is configured to process the data query and receives the results of the data query. The results indicate that additional data elements relevant to the search criteria have been identified, and that the additional data elements are currently inaccessible. The computer system then displays an indication of various steps that are to be taken in order to access the currently inaccessible additional data elements, where the steps to be taken are displayed along with the received data query results and/or upon the occurrence of a specified event.

In another embodiment, a computer system generates and displays a user interface that allows access to supplemental query data that is relevant to a search query. The computer system receives data query results in response to a data query that includes various search criteria. The data query results indicate that currently inaccessible additional data elements relevant to the search criteria have been identified and that they are stored at one or more specified data sources. The computer system generates a user interface (UI) that shows an indication of steps that are to be taken in order to access the currently inaccessible additional data elements. The steps to be taken are displayed along with the received data query results and/or upon the occurrence of a specified event. The UI receives an input corresponding to the steps that are to be taken to access the identified additional data elements and, upon determining that the input received at the UI allows access to the specified data sources, the computer system sends the received input to the specified data sources to retrieve the identified additional data elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
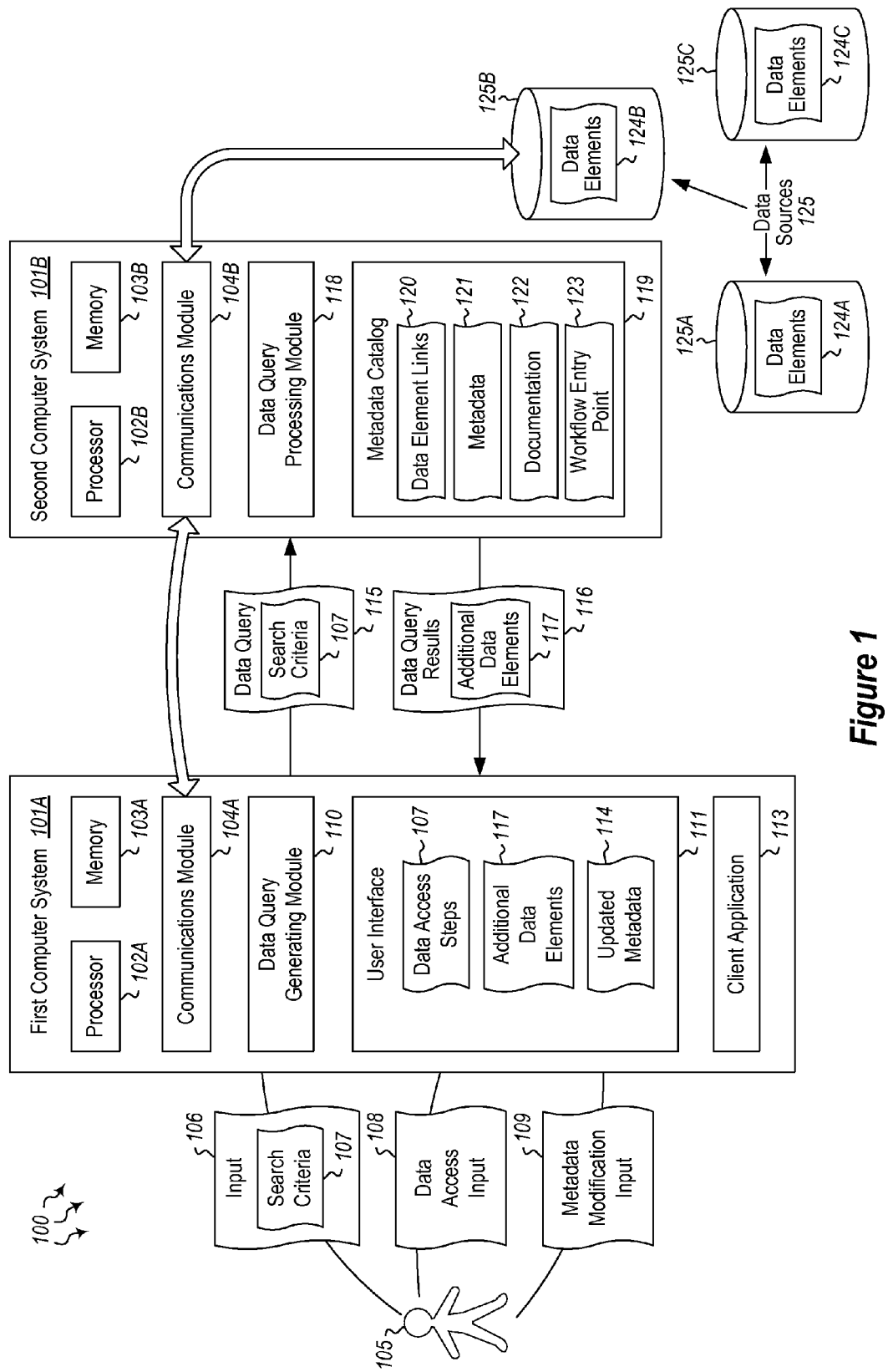
FIG. 1 illustrates a computer architecture in which embodiments described herein may operate including providing access to supplemental query data that is relevant to a data query.

Embodiments described herein are directed to providing access to supplemental query data that is relevant to a data query and to generating and displaying a user interface that allows access to supplemental query data that is relevant to a search query. In one embodiment, a computer system receives an input indicating that a data query is to be processed, where the input provides various search criteria. The computer system then generates the data query according to the search criteria in the received input. The computer system further sends the data query to a second computer system which is configured to process the data query and receives the results of the data query. The results indicate that additional data elements relevant to the search criteria have been identified, and that the additional data elements are currently inaccessible. The computer system then displays an indication of various steps that are to be taken in order to access the currently inaccessible additional data elements, where the steps to be taken are displayed along with the received data query results and/or upon the occurrence of a specified event.

In another embodiment, a computer system generates and displays a user interface that allows access to supplemental query data that is relevant to a search query. The computer system receives data query results in response to a data query that includes various search criteria. The data query results indicate that currently inaccessible additional data elements relevant to the search criteria have been identified and that they are stored at one or more specified data sources. The computer system generates a user interface (UI) that shows an indication of steps that are to be taken in order to access the currently inaccessible additional data elements. The steps to be taken are displayed along with the received data query results and/or upon the occurrence of a specified event. The UI receives an input corresponding to the steps that are to be taken to access the identified additional data elements and, upon determining that the input received at the UI allows access to the specified data sources, the computer system sends the received input to the specified data sources to retrieve the identified additional data elements.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101A typically includes at least one processing unit 102A and memory 103A. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103A of the computing system 101A. Computing system 101A may also contain communication channels that allow the computing system 101A to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103A. The system memory may also be referred to as "main memory", and includes memory locations that are addressable by the at least one processing unit 102A over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer systems 101A and 101B. Computer systems 101A and 101B may each be any type of local or distributed computer system, including cloud computing systems. The computer systems includes various modules for performing different functions. For instance, communications modules 104A/104B are configured to communicate with other computer systems, typically via wired or wireless connections. The communications modules may, for example, receive inputs from users such as user 105. The communication modules 104A/104B may also transmit data to and from each other, to and from the various data sources 125, and to and from other computer systems not shown in FIG. 1.

The data sources 125A-C may be any type of data stores including local data stores, distributed data stores, storage area networks (SANs) or other systems or means for storing data. Each data source 125 stores data elements 124A-C. The data elements may be any portion of data including individual data files or groups of files, database columns or rows or other data structures. The data sources may be local or remote to first computer system 101A and/or second computer system 101B. Both the first and second computer systems may have access to all or portions of the data sources 125, depending on the current computer user's data access rights.

For instance, user 105 may wish to perform a query against one or more of the data sources 125. The user may input search criteria 107 (on input 106) which are used by data query generating module 110 to generate a query 115. The generated query 115 includes the user-specified search criteria 107. The query is transmitted from the first computer system 101A to the second computer system 101B. The data query processing module 118 processes the data query 115, accessing one or more of the data sources to satisfy the query. In some cases, the data query processing module may determine that additional data elements relevant to the search exist, but are not currently accessible to the user. For example, the additional data elements may be secured behind a data access wall that prevents unauthorized access. The user may, however, be able to access these data elements upon proper authentication. The second computer system 101B may send back any query results 116 that were found within data elements to which the user has access, and may further include an indication 117 of those additional data elements that are relevant to the user-provided search criteria 107, but not currently accessible to the user. The indication may further indicate one or more steps the user is to take in order to access the additional data.

In this manner, embodiments described herein provide business users and other end-users with relevant information when they attempt to connect to a data source. For example, when a connection dialog box (or similar user experience) is displayed to a user (e.g. 105), the system described herein will display an option for the user to view data source documentation 122, and may further display an option to initiate a defined business process (e.g. workflow entry point 123) to request access to the data source 125.

A metadata catalog 119 may be provided that stores metadata 121 about data sources 125 and other objects. The metadata catalog may be a service, including a local service or a cloud-based service. The data maintained by the metadata catalog may include data source locations (e.g. data element links 120), business documentation 122 (along with other information about the data sources), and may include access workflow entry points 123. The access workflow entry points 123 may allow the user 105 to begin a workflow that will allow them to access data that was previously inaccessible (e.g. by providing proper credentials). Embodiments herein also consolidate lineage (i.e. relationship)

information for the various data artifacts and elements that are stored. With this information, the system can surface related and relevant information to the user.

For example, if the query does not have a specific request to access information, the system can look back in lineage information to infer the request access information. Moreover, the system implements containers such that it understands and can interpret an element that is hosted within another element, and can propagate metadata within containers and for related data sources in this manner. As such, if metadata has not been provided for a database, the system can look at the data element's container (the database server) and infer metadata from the container, or from other related data sources.

In some embodiments, metadata 121 provided by multiple items in the lineage or container chain may be blended together to provide the end-user a full 360 degree view of the information that is available and that they are interacting with. The system also supports multiple automatic algorithms to infer additional metadata (certification, column names, lineage, container relationships, descriptions, etc.) by looking at the structure of the data, the structure of metadata that surrounds the current set of metadata (e.g. similar columns in the same data source), metadata that has been provided earlier by the same author or other authors that are interacting with the system, or through other means. The system can automatically look at the lineage of data to understand whether a current data artifact should be certified, what categorization and classification should be applied and then apply and/or certify it. If requested, the system may provide information on how the attributes were gathered and display that information to the user.

Annotations and metadata for data sources can also be provided in social form. As at least some embodiments of the metadata catalog run as a service within the cloud (indeed, the metadata catalog may run locally, distributed or in a federated system), multiple people that interact with the service can provide annotations (social annotations/metadata). These are then applied or, in some cases, first approved by a user, a quorum of users (e.g. people that are endorsing or using the data source(s)), or by a central authority. The system can also learn from this and automatically approve annotations in the future. As such, the system can learn from all the input that is provided, and can automatically identify types of data (columns, tables, datasets) by observing how authors provide this information manually and then suggesting best matches in the future.

A client application experience allows users to share data objects. The client application (which may run locally, distributed or on a federated system) may send data source metadata, including data storage locations and connection details, to the cloud service. The client application may also be used to provide and surface metadata. The client application further interacts with the metadata catalog service 119 to provide the interface where the service would expose the supplemental data to the end-user. The client application can also be an application that sits in the cloud or on the machine of the user 105 (e.g. computer system 101A).

A stewardship application may also be provided (which may be different than, or part of the client application) that allows authorized users to modify or annotate data sources with additional metadata. The authorized users may modify or annotate data sources by adding documentation 122 and the entry point (such as a URL or email address) for a data access business workflow 123. Still further, a data consumption/analysis application experience may be provided that retrieves data source metadata from the cloud service and presents it to the user 105 in the context of connecting to a secure data source.

A list of known data sources may be provided in a data manager portal, and exposed to authorized data managers. As used herein, the term "authorized data managers" may refer to administrators, stewards, data experts or other users that are authorized to make changes to the metadata catalog. Using the data manager portal, company data managers, curators or owners may provide metadata 121 for data sources 125, supplementing any existing metadata (such as location and type) with business- or user-friendly names and descriptions, and further provide an entry point 123 for a business process to request access to the data source. This entry point may be an email address, a web page URL, or any URI-addressable endpoint. This manager-provided metadata is stored in the metadata catalog 119.

Subsequently, when users use the client application to connect to a data source (e.g. 125A), the connection experience will display the friendly name and business description for the data source, along with a link to request access to the data. Users who do not have the requisite permissions to access to the data source can select this link to initiate the request access workflow. The connection experience (both the discovery of data sources and the display of metadata and access link) can be presented in any client application that communicates with the metadata catalog, including standalone client applications and clients that are built in to other applications or services. These concepts will be explained further below with regard to methods 200 and 300 of FIGS. 2 and 3, respectively.

Figure 2:
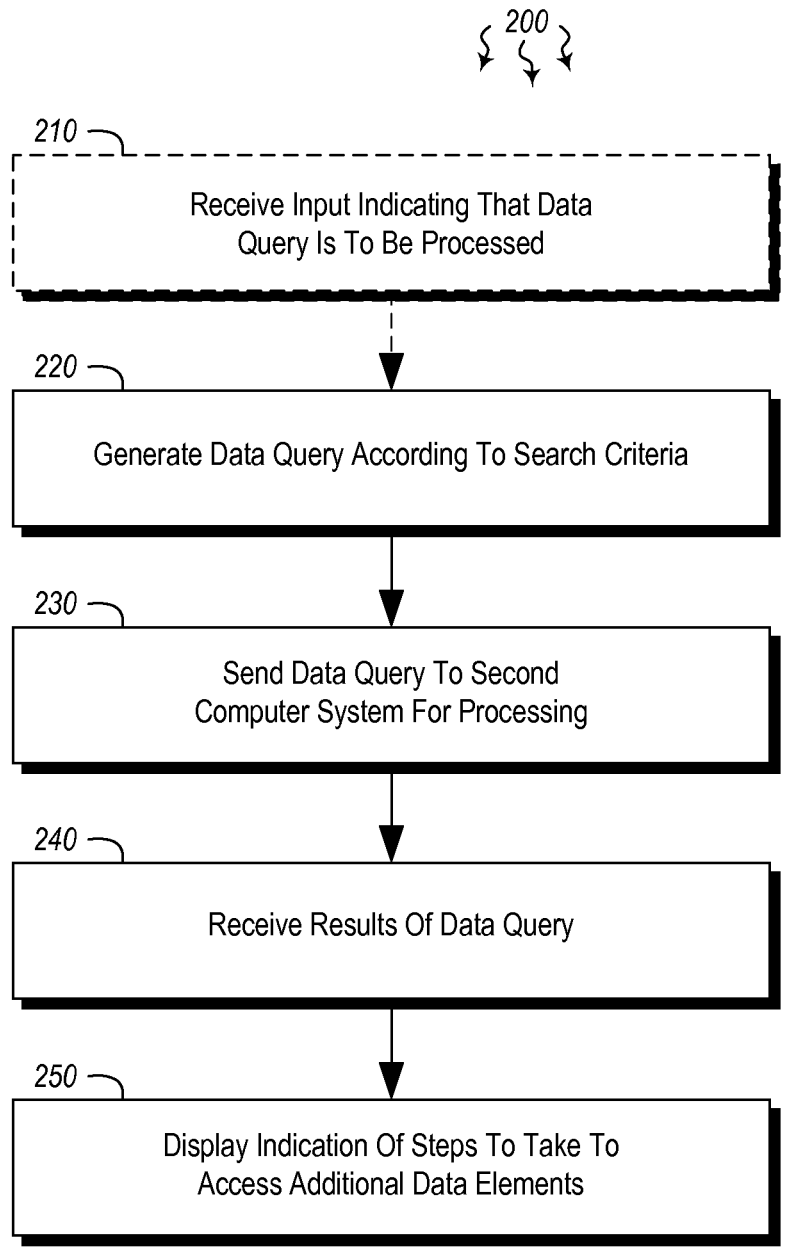
FIG. 2 illustrates a flowchart of an example method for providing access to supplemental query data that is relevant to a data query.
Figure 3:
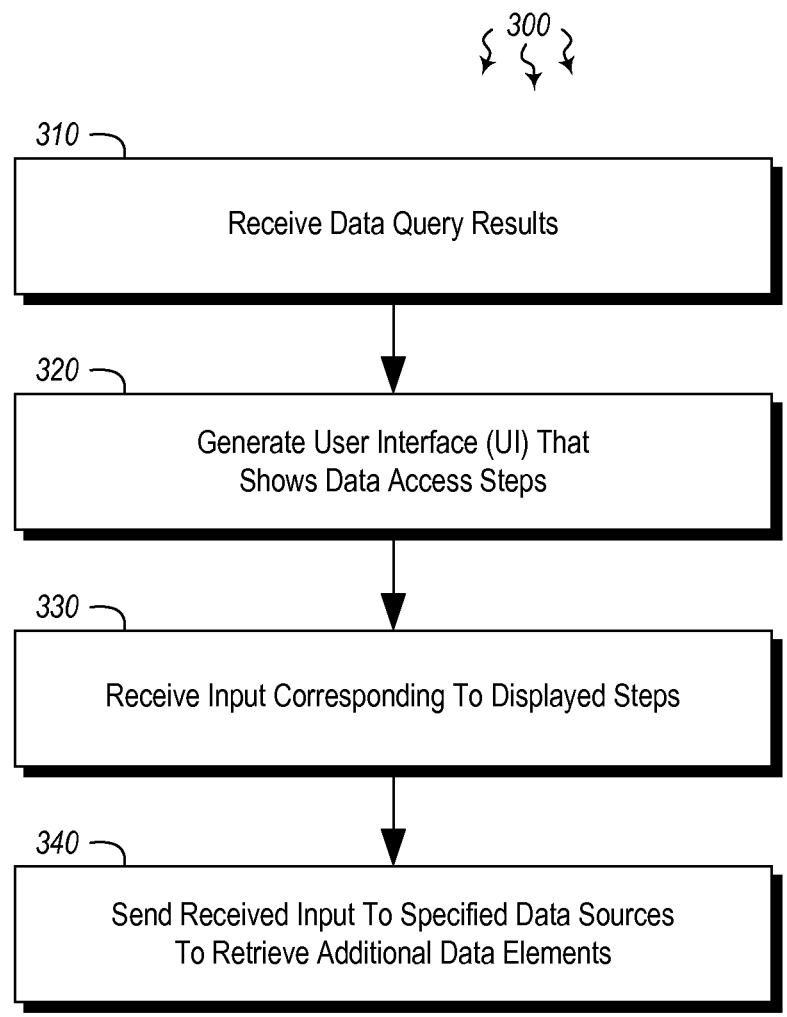
FIG. 3 illustrates a flowchart of an example method for generating and displaying a user interface that allows access to supplemental query data that is relevant to a search query.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing access to supplemental query data that is relevant to a data query. The method 200 will now be described with frequent reference to the components and data of environment 100.

Method 200 includes an optional act of receiving an input indicating that a data query is to be processed, the input providing one or more search criteria (act 210). For example, the communications module 104A of computer system 101A may receive input 106 indicating that a query is to be processed. The input may provide various different search terms and other search criteria 107 for the search. The data query generating module 110 may then generate a data query 115 according to the search criteria in the received input (act 220). The communications module 104A may then send the data query to the second computer system 101B which is configured to process the data query (act 230). The second computer system 101B includes a data query processing module 118 which processes the query 115 according to the search criteria 107 specified by the user 105.

After the query has been processed, and the relevant data corresponding to the query has been retrieved, the first computer system 101A receives the results 116 of the data query. The results indicate that one or more additional data elements relevant to the search criteria have been identified, the additional data elements being currently inaccessible (act 240).

For example, the data elements may be stored in a data store to which the user does not currently have access. As the query may be processed using data elements from multiple data sources 125, one or more of these data sources may be behind a paywall or behind some other sort of wall that prevents unauthorized access. These additional data elements (or an indication thereof) may be displayed to the user 105. The display may thus include an indication of available data elements, and further include various steps that are to be taken in order to access the currently inaccessible additional data elements, where the steps to be taken are displayed along with the received data query results and/or upon the occurrence of a specified event (act 250). For instance, the steps to be taken may be displayed next to, above, below or near the returned query results. Additionally or alternatively, the steps to be taken may be accessed upon the occurrence of an event such as a mouse click, mouseover, touch input or some other event. The steps to be taken may be provided by the first computing system 101A, by the second computing system 101B, by another computing system (not shown in FIG. 1) or by a third party.

After viewing the steps that are to be taken to access one or more of the additional data elements 117, the user may send a data access input 108 to the first computer system 101A. The data access input 108 may correspond to at least one of the steps provided in the indication of additional data elements. For example, if one of the data access steps says to provide a user name and password, or to click a button to initiate a data access workflow, or to provide an email address or other identifier, or to perform some other step, the user may do so in order to access the additional data elements. The user's input may be received at a user interface 111 at the first computer system 101A, or via some other means. Once the input is received, the computer system 101A may perform the steps indicated by the user's data access input 108. Once the process has successfully completed, and the user has been granted access to the data store(s) storing the additional data elements, the data elements may be accessed (either directly by computer system 101A, or in some cases, the second computer system 101B may access the data elements and send them to the first computer system 101A) and provided to the user. In some embodiments, the additional data elements 117 may be displayed in UI 111 next to the original query results 116.

As such, the UI 111 may be configured to display the data access steps 112 needed to access the additional data, and may further display the additional data once it is received alongside the existing query results 116. The UI can display a prompt for authentication credentials or other identifiers that would allow the user access to the additional data elements. If subsequent authentication, workflow or other steps are needed, those may also be displayed in the UI 111. The UI may be generated and/or updated dynamically on-demand. Thus, if a user has entered a certain query, and has received certain results, the UI may be dynamically generated to show those results. The dynamically generated UI may further generate prompts, buttons or other means for allowing the user to provide inputs in order to access any additional data elements 117 indicated in the query results 116.

The UI 111 may further display a data source name for any or all of the additional data elements 117. The source name may be a full name and path, or may be a simplified, user-friendly name that is easier to remember and understand. The UI may also display an option to initiate a data access workflow 123 to access resources at the named data source. The data access workflow may lead the user 105 through a series of steps that, when completed, provide access to the data elements. In cases where the series of steps includes authentication or other forms of access control, the authentication or access control capabilities may be provided by a third party by another module on computer system 101A and/or 101B. In some cases, a data manager may be notified upon determining that a particular data access workflow has been initiated (e.g. when the data manager is the owner of the data). As such, the owner of the data may be apprised of how and when users are accessing the owner's data.

Still further, in some cases, the data access workflow may access a metadata catalog 119 to determine how to connect to specified data source 125. As mentioned above, the metadata catalog 119 is configured to store metadata that maps data elements to data sources. The metadata catalog thereby allows any client application that has access to the metadata catalog, access to the metadata 121 and the stored data elements 124A-C. The metadata catalog will be explained in greater detail below with regard to methods 300 and 400 of FIGS. 3 and 4.

FIG. 3 illustrates a flowchart of a method 300 for generating and displaying a user interface that allows access to supplemental query data that is relevant to a search query. The method 300 will now be described with frequent reference to the components and data of environment 100.

Method 300 includes an act of receiving data query results in response to a data query that includes one or more search criteria, the data query results indicating that one or more currently inaccessible additional data elements relevant to the search criteria have been identified, the additional data elements being stored at one or more specified data sources (act 310). For example, communications module 104A may receive data query results 116 from the communications module 104B of computer system 101B. The data query results include those data elements that corresponded to the user's search criteria 107, and were accessible to the user. The data query results 116 may also include an indication that additional data elements 117 are available and are pertinent to the user's search criteria 107. The first computer system 101A may generate a UI that shows an indication of steps 112 that are to be taken in order to access the currently inaccessible additional data elements, where the steps to be taken are displayed along with the received data query results and/or upon the occurrence of a specified event (act 320).

The user 105 may then provide an input 108 which may be received at the UI 111. The input corresponds to at least one of the data access steps 112 that are to be taken to access the identified additional data elements (act 330). Upon determining that the input received at the UI 111 allows access to the specified data sources (e.g. 125A-C), the computer system 101A may send the received data access input 108 to the specified data sources to retrieve the identified additional data elements (act 340). Thus, for example, a user may provide subscription information to access data that is only available to subscribers (e.g. movies or television shows). This subscription data, along with any other additional data elements that are accessible to the user, may be sent to the user (either directly from the data sources 125, or through the second computer system 101B) and received at the first computer system 101A. The additional data elements (in this example, the subscription data) may be displayed in UI 111.

In some embodiments, the UI 111 may include a generic interface to request data from multiple different data sources. These data sources may be multiple different data source types. For instance, a data source may be a website, a cloud data provider, a local data store or other type of data source. The data query results 116 may include data from any number and/or type of data sources. In some cases, users may share links to data sources, or directly to certain data elements within the data sources. A client application 113 may be provided which allows users to share links 120 to data objects stored in the data sources 125. Additionally or alternatively, the client application may allow users to share data objects directly with other users. The client application can look at metadata 121 related to the data sources and data elements, and make determinations as to how best to access the data. The client application itself 113 may be a stand-alone application, or may be built-in as part of another application. The client application may monitor user inputs, and may collect data and use heuristics to update internal processes based on the accessed information. For example, if the client application determines that a certain user input is used to request certain data, or that certain requests lead to additional prompts, the client application may learn from these past scenarios, and may prompt the user for certain inputs accordingly.

In another embodiment, a computer system generates and displays a user interface that allows data managers to provide supplemental metadata for data sources.

The computer system 101B generates a user interface (UI) that shows an indication of one or more data elements to which a metadata catalog is linked, the metadata catalog including references to one or more different data sources that store data elements. The UI 111 may thus show data elements that are included in the metadata catalog 119. The metadata catalog 119 may link to data sources 125, as well as individual data elements (e.g. via link 120). The user 105 may submit an input 109 at UI 111 which indicates that metadata for at least one of the data sources 125 is to be modified. The modification includes at least one of the following: providing additional metadata 121 for a specified data source, providing documentation 122 for a specified data source and providing an entry point for an access request workflow 123.

For example, a data manager may wish to provide metadata for a given data source. This metadata may be shown to users that are requesting data from or are querying that data source. For instance, when a user is requesting data from data source 125B, and the data manager has provided metadata 121 for that data source (perhaps indicating information about the data source such as its name, its general content, and methods of accessing the data), that metadata will be displayed in the UI along with the query results 116. Similarly, if a data manager adds documentation 122 regarding a data source, adds a data access workflow entry point 123, or performs some other form of metadata modification, the results of the modification may be shown in the UI 111 along with the data query results 116.

The computer system 101B may further perform the received data source metadata modification according to the received input and, upon determining that the metadata has been modified, the updated metadata 114 for the data sources is displayed in the UI. Thus, the updated metadata 121, documentation, workflow entry point 123 or other metadata modification is shown to the user in the dynamically generated UI 111. The UI may further allow user 105 to modify data elements stored on the data sources. The user may make changes to UI elements, and have those changes propagated back to the data stores on which the data elements are stored.

Still further, the UI may allow users to provide feedback regarding the metadata 121 provided by the data manager. The feedback provided by the user may be reviewable by the data manager. As such, if the user suggested changing a column name, for example, and the data manager noticed that multiple users had requested changing that column name, the data manager may make the appropriate changes. As such, a user (or group of users) may be able to effect changes in the metadata 121 associated with the data sources. In some cases, an user other than a data manager can verify the changes, such as a verified user, or a quorum of users that have approved a change. The metadata may indicate a variety of different things, including indicating, for example, that a data source is an authoritative source (i.e. the master source for certain data elements) among multiple sources. In some cases, each user may be assigned its own metadata repository, and may be able to update and/or control the metadata 121 associated with the data sources. In such cases, usage of the user's metadata repository may be monitored, and then used to improve the original metadata repository. In this manner, the metadata catalog can learn and improve over time, both from the users' feedback and from monitoring the actual usage of the catalog.

Accordingly, methods, systems and computer program products are provided which provide access to supplemental query data that is relevant to a data query, and further generate and display user interfaces that allow access to supplemental query data that is relevant to a search query.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors; and
one or more computer-readable storage media having stored thereon computer-executable instructions that are executable by the one or more processors to configure the computer system to provide access to supplemental query data that is relevant to a data query, the computer-executable instructions including instructions that are executable to configure the computer system to perform at least the following:
generate a data query according to one or more search criteria received in a first input, the data query being associated with a user;
send the data query to a second computer system, which is configured to process the data query;
receive results of the data query from the second computer system, the results indicating:
one or more data elements that are stored at a first data source to which the user has access, and that are relevant to the one or more search criteria;
an identity of a second data source to which the user currently lacks access that stores one or more additional data elements that are also relevant to the one or more search criteria; and
one or more supplemental data elements for exposing other relevant data items or search queries, the one or more supplemental data elements including supplemental information relating to at least one of the one or more data elements that are stored at the first data source and the one or more additional data elements that are also relevant to the one or more search criteria, the supplemental information comprising at least one of lineage information, container information, or user-provided annotations, wherein the one or more supplemental data elements are provided by a metadata catalog; and display at a user interface (i) a first indication of the one or more data elements that are accessible to the user, (ii) a second indication of the identity of the second data source to which the user currently lacks access, the second indication being associated with one or more steps that are to be taken in order for the user to authenticate to the second data source, wherein the one or more steps to be taken are displayed at the user interface along with the second indication of the identity of the second data source, and (iii) a third indication of the one or more supplemental data elements for exposing other relevant data items or search queries.

2. The computer system of claim 1, the computer-executable instructions also including instructions that are executable to configure the computer system to:

receive a second input, wherein the second input corresponds to at least one of the one or more steps to authenticate to the second data source;

perform the one or more steps indicated by the received second input; and access at least one of the one or more additional data elements from the second data source.

3. The computer system of claim 2, wherein at least one of the steps performed comprises providing user authentication credentials.

4. The computer system of claim 1, wherein the user interface displays an option to initiate a data access workflow to access resources at the second data source.

5. The computer system of claim 4, wherein one or more data managers are notified upon determining that the data access workflow has been initiated.

6. The computer system of claim 4, wherein upon determining that the data access workflow has been initiated, the data access workflow automatically initiates a first of one or more workflow steps that, upon successful completion, allow the user to access the one or more additional data elements.

7. The computer system of claim 4, wherein the data access workflow accesses a metadata catalog to determine how to connect to the second data source, the metadata catalog being configured to store metadata that maps data elements to data sources.

8. The computer system of claim 1, wherein the data query is processed using data from a plurality of different data sources.

9. The computer system of claim 1, the computer-executable instructions also including instructions that are executable to configure the computer system to receive an input indicating that the data query is to be processed, the input providing the one or more search criteria.

10. The computer system of claim 1, wherein the additional steps to be taken to access the second data source are provided by the computer system.

11. The computer system of claim 1, wherein the one or more steps to be taken are displayed at the user interface upon the occurrence of a specified event.

12. The computer system of claim 1, wherein at least one of the one or more data elements comprises a container that includes a child data element hosted within a parent data element.

13. A computer system comprising the following:

one or more processors; and one or more computer-readable storage media having stored thereon computer-executable instructions that are executable by the one or more processors to configure the computer system to generate and display a user interface that allows access to supplemental query data that is relevant to a search query, the computer-executable instructions including instructions that are executable to configure the computer system to perform at least the following:

receive data query results in response to a data query from a user that includes one or more search criteria, the data query results indicating:

one or more data elements that are stored at a first data source to which the user has access, and that are relevant to the one or more search criteria;

an identity of a second data source to which the user currently lacks access that stores one or more currently inaccessible additional data elements that are also relevant to the one or more search criteria; and one or more supplemental data elements for exposing other relevant data items or search queries, the one or more supplemental data elements including supplemental information relating to at least one of the one or more data elements that are stored at the first data source and the one or more additional data elements that are also relevant to the one or more search criteria, the supplemental information comprising at least one of lineage information, container information, or user-provided annotations, wherein the one or more supplemental data elements are provided by a metadata catalog;

generate a user interface (UI) that shows (i) a first indication of the one or more data elements that are accessible to the user, (ii) a second indication of the identity of the second data source to which the user currently lacks access, the second indication being associated with one or more steps that are to be taken in order for the user to authenticate to the second data source, wherein the one or more steps to be taken are displayed at the UI along with the second indication of the identity of the second data source, and (iii) a third indication of the one or more supplemental data elements for exposing other relevant data items or search queries;

receive at the UI an input corresponding to at least one of the one or more steps that are to be taken to authenticate to the second data source; and upon determining that the input received at the UI allows access to the second data source, send the received input to the second data source to retrieve the one or more additional data elements.

14. The computer system of claim 13, the computer-executable instructions also including instructions that are executable to configure the computer system to:

receive the identified additional data elements from the second data source; and display the received additional data elements in the UI.

15. The computer system of claim 13, wherein the UI includes a generic interface to request data from a plurality of different data sources of multiple different data source types.

16. The computer system of claim 13, wherein a client application is provided which allows users to share links to data objects stored in the one or more specified data sources.

17. The computer system of claim 16, wherein the client application accesses one or more portions of information including user inputs, heuristics and data source data accesses, and updates one or more internal processes based on the accessed information.

18. The computer system of claim 17, wherein the client application prompts for user inputs based on the updated internal processes.

19. A method, implemented at a computer system that includes at least one processor, for providing access to supplemental query data that is relevant to a data query, the method comprising:
   generating a data query according to one or more search criteria received in an input, the data query being associated with a user;
   sending the data query to a second computer system, which is configured to process the data query;
   receiving the results of the data query from the second computer system, the results indicating:
      one or more data elements that are stored at a first data source to which the user has access, and that are relevant to the one or more search criteria;
      an identity of a second data source to which the user currently lacks access that stores one or more additional data elements that are also relevant to the one or more search criteria; and
      one or more supplemental data elements for exposing other relevant data items or search queries, the one or more supplemental data elements including supplemental information relating to at least one of the one or more data elements that are stored at the first data source and the one or more additional data elements that are also relevant to the one or more search criteria, the supplemental information comprising at least one of lineage information, container information, or user-provided annotations, wherein the one or more supplemental data elements are provided by a metadata catalog; and
   displaying at a first user interface (i) a first indication of the one or more data elements that are accessible to the user, (ii) a second indication of the identity of the second data source to which the user currently lacks access, the second indication being associated with one or more steps that are to be taken in order for the user to authenticate to the second data source, wherein the one or more steps to be taken are displayed at the user interface along with the second indication of the identity of the second data source, and (iii) a third indication of the one or more supplemental data elements for exposing other relevant data items or search queries.

20. A computer program product comprising one or more hardware storage devices having stored thereon computer-executable instructions that are executable by one or more processors of a computing system to configure the computing system to provide access to supplemental query data that is relevant to a data query, the computer-executable instructions including instructions that are executable to configure the computing system to perform at least the following:
   generate a data query according to one or more search criteria received in an input, the data query being associated with a user;
   send the data query to a second computing system, which is configured to process the data query;
   receive results of the data query from the second computing system, the results indicating:
      one or more data elements that are stored at a first data source to which the user has access, and that are relevant to the one or more search criteria;
      an identity of a second data source to which the user currently lacks access that stores one or more additional data elements that are also relevant to the one or more search criteria; and
      one or more supplemental data elements for exposing other relevant data items or search queries, the one or more supplemental data elements including supplemental information relating to at least one of the one or more data elements that are stored at the first data source and the one or more additional data elements that are also relevant to the one or more search criteria, the supplemental information comprising at least one of lineage information, container information, or user-provided annotations, wherein the one or more supplemental data elements are provided by a metadata catalog; and
   display at a user interface (i) a first indication of the one or more data elements that are accessible to the user, (ii) a second indication of the identity of the second data source to which the user currently lacks access, the second indication being associated with one or more steps that are to be taken in order for the user to authenticate to the second data source, wherein the one or more steps to be taken are displayed at the user interface along with the second indication of the identity of the second data source, and (iii) a third indication of the one or more supplemental data elements for exposing other relevant data items or search queries.

21. A method, implemented at a computer system that includes one or more processors, for generating and displaying a user interface that allows access to supplemental query data that is relevant to a search query, the method comprising:
   receiving data query results in response to a data query from a user that includes one or more search criteria, the data query results indicating:
      one or more data elements that are stored at a first data source to which the user has access, and that are relevant to the one or more search criteria;
      an identity of a second data source to which the user currently lacks access that stores one or more currently inaccessible additional data elements that are also relevant to the one or more search criteria; and
      one or more supplemental data elements for exposing other relevant data items or search queries, the one or more supplemental data elements including supplemental information relating to at least one of the one or more data elements that are stored at the first data source and the one or more additional data elements that are also relevant to the one or more search criteria, the supplemental information comprising at least one of lineage information, container information, or user-provided annotations, wherein the one or more supplemental data elements are provided by a metadata catalog; and
   generating a user interface (UI) that shows (i) a first indication of the one or more data elements that are accessible to the user, (ii) a second indication of the identity of the second data source to which the user currently lacks access, the second indication being associated with one or more steps that are to be taken in order for the user to authenticate to the second data source, wherein the one or more steps to be taken are displayed at the UI along with the second indication of the identity of the second data source, and (iii) a third indication of the one or more supplemental data elements for exposing other relevant data items or search queries;

receiving at the UI an input corresponding to at least one of the one or more steps that are to be taken to authenticate to the second data source; and upon determining that the input received at the UI allows access to the second data source, sending the received input to the second data source to retrieve the one or more additional data elements.

22. A computer program product comprising one or more hardware storage devices having stored thereon computer-executable instructions that are executable by one or more processors of a computing system to configure the computing system to, generate and display a user interface that allows access to supplemental query data that is relevant to a search query the computer-executable instructions including instructions that are executable to configure the computing system to perform at least the following:

receive data query results in response to a data query from a user that includes one or more search criteria, the data query results indicating:

one or more data elements that are stored at a first data source to which the user has access, and that are relevant to the one or more search criteria;

an identity of a second data source to which the user currently lacks access that stores one or more currently inaccessible additional data elements that are also relevant to the one or more search criteria; and one or more supplemental data elements for exposing other relevant data items or search queries, the one or more supplemental data elements including supplemental information relating to at least one of the one or more data elements that are stored at the first data source and the one or more additional data elements that are also relevant to the one or more search criteria, the supplemental information comprising at least one of lineage information, container information, or user-provided annotations, wherein the one or more supplemental data elements are provided by a metadata catalog; and generate a user interface (UI) that shows (i) a first indication of the one or more data elements that are accessible to the user, (ii) a second indication of the identity of the second data source to which the user currently lacks access, the second indication being associated with one or more steps that are to be taken in order for the user to authenticate to the second data source, wherein the one or more steps to be taken are displayed at the UI along with the second indication of the identity of the second data source, and (iii) a third indication of the one or more supplemental data elements for exposing other relevant data items or search queries;

receive at the UI an input corresponding to at least one of the one or more steps that are to be taken to authenticate to the second data source; and upon determining that the input received at the UI allows access to the second data source, send the received input to the second data source to retrieve the one or more additional data elements.

* * * * *